United States Patent
Adams et al.

(10) Patent No.: US 8,227,121 B2
(45) Date of Patent: Jul. 24, 2012

(54) FUEL CELL SUPPLY INCLUDING INFORMATION STORAGE DEVICE AND CONTROL SYSTEM

(75) Inventors: Paul Adams, Monroe, CT (US);
Andrew J. Curello, Hamden, CT (US);
Floyd Fairbanks, Naugatuck, CT (US)

(73) Assignee: Societe Bic, Clichy Cedex (FR)

( * ) Notice: Subject to any disclaimer, the term of this patent is extended or adjusted under 35 U.S.C. 154(b) by 0 days.

(21) Appl. No.: 13/020,512

(22) Filed: Feb. 3, 2011

(65) Prior Publication Data
US 2011/0123889 A1    May 26, 2011

Related U.S. Application Data

(62) Division of application No. 12/686,136, filed on Jan. 12, 2010, now Pat. No. 7,901,834, and a division of application No. 10/725,237, filed on Dec. 1, 2003, now Pat. No. 7,655,331.

(51) Int. Cl.
*H01M 8/04* (2006.01)
*H01M 8/02* (2006.01)

(52) U.S. Cl. ......... 429/429; 429/428; 429/512; 429/515

(58) Field of Classification Search ........................ None
See application file for complete search history.

(56) References Cited

U.S. PATENT DOCUMENTS 7,291,191 B2 * 11/2007 Kaye ............................. 55/385.4
2003/0169022 A1   9/2003 Turner et al.

FOREIGN PATENT DOCUMENTS

WO        2005/004258 A2    1/2005

* cited by examiner

*Primary Examiner* — John S Maples
(74) *Attorney, Agent, or Firm* — The H.T. Than Law Group

(57) ABSTRACT

The present invention is directed to a fuel cell system with various features for optimal operations of an electronic device, a battery charger or a fuel refilling device. The fuel cell system includes an information storage device associated with the fuel supply, pump and/or refitting device. The information storage device can be any electronic storage device including, but not limited to, an EEPROM or a PLA. The information storage device can include encrypted information. The information storage device can include software code for confirming the identification of the cartridge before operation of the electronic device and/or refilling device. The information storage device can include instructions for a hot swap operation to shut down property when the fuel supply is ejected while the electronic device is in operation. The present invention is also directed to system architecture for a fuel cell system that utilizes information storage devices. The system architecture may have flow regulators, which include a regulating valve.

22 Claims, 10 Drawing Sheets

(a)   (b)

(c)   (d)

(e)

(f)

(g)

(h)

292 FIG. 7 Continued
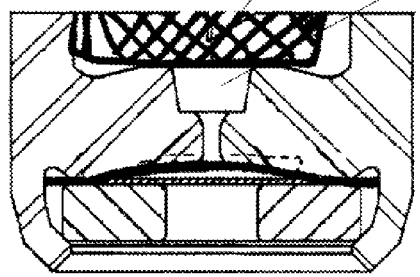
(i)
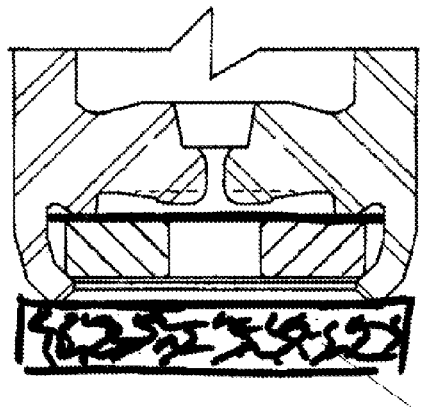
(j)
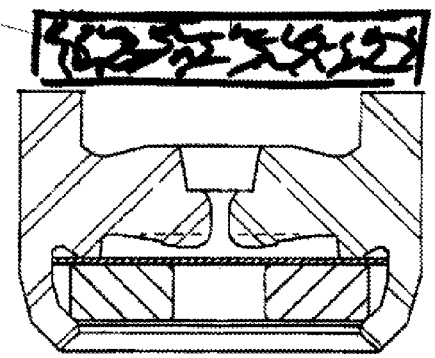
(k)

FUEL CELL SUPPLY INCLUDING INFORMATION STORAGE DEVICE AND CONTROL SYSTEM

CROSS-REFERENCE TO RELATED APPLICATIONS

The present application is a divisional application of U.S. patent application Ser. No. 12/686,136 now U.S. Pat. No. 7,901,834, which was filed on Jan. 12, 2010, which is a divisional application of U.S. patent application Ser. No. 10/725,237, filed on Dec. 1, 2003, and issued as U.S. Pat. No. 7,655,331. The '136 and '237 applications are incorporated by reference herein in their entireties.

FIELD OF THE INVENTION

This invention generally relates to filet cell systems, and more particularly to fuel systems using fuel cells and fuel cartridges; and yet more particularly this invention relates to incorporating information storage devices into such systems.

BACKGROUND OF THE INVENTION

Fuel cells are devices that directly convert chemical energy of reactants, i.e., fuel oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely fuel cells utilizing compressed hydrogen ($H_2$) as fuel, proton exchange membrane (PEM) fuel cells that use methanol ($CH_3OH$), sodium borohydride ($NaBH_4$), hydrocarbons such as butane) or other fuels reformed into hydrogen fuel, and REM fuel cells that use methanol ($CH_3OH$) fuel directly ("direct methanol fuel cells" or DMFC). Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat filet cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Reaction at the anode:

$$CH_3OH+H_2O \rightarrow CO_2+6H^++6e^-$$

Reaction at the cathode:

$$O_2+4H^++4e^- \rightarrow 2H_2O$$

The overall fuel cell reaction:

$$CH_3OH+1.5O_2 \rightarrow CO_2+2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants and laptop computers, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated material having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The cell reaction for a sodium borohydride reformer fuel cell is as follows:

$$NaBH_4(aqueous)+2H_2O(\text{heat or catalyst}) \rightarrow 4(H_2)+ (NaBO_2)(aqueous)$$

$$H_2 \rightarrow 2H^++2e^- (\text{at the anode})$$

$$2(2H^++2e^-)+O_2 \rightarrow 2H_2O(\text{at the cathode})$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. Sodium borohydride fuel cell is discussed in United States published patent application no. 2003/0082427, which is incorporated herein by reference.

The patent literature discloses a number of containers for consumable substances that include electronic memory components. United States patent application publication no. US 2002/0154815 A1 discloses a variety of containers that may include read-only memories, programmable read-only memories, electronically erasable programmable read-only memories, non-volatile random access memories, volatile random access memories or other types of electronic memory. These electronic memory devices may be used to retain coded recycle, refurbishing and/or refilling instructions for the containers, as well as a record of the use of the containers. The containers may comprise liquid ink or powdered toner for a printer. Alternatively, the containers may comprise a fuel cell.

United States patent application publication nos. US 2003/0082416 A1 and 2003/0082426 A1 disclose a system including a host device and a fuel cell apparatus with an information storage device. The host device may be for example a PDA powered by a fuel stack and a removable fuel cartridge. The fuel cartridge includes the information storage device, which may be a non-volatile serial EEPROM memory chip. The data stored on the chip can be related to fuel management data, safety information, and marketing and manufacturing information. The initial fuel level data can be write-protected while the current fuel level is defined by a decrementable data field.

Japanese publication no. JP2003049996 discloses a hydrogen cartridge that has a memory device, a controller and a communication interface, Japanese publication no. JP2002161997 discloses another hydrogen cartridge that has bar code printed thereon. The bar code contains identification information for the cartridge. International publication no. WO 03/012902A1 discloses unit fuel cells with bar codes printed on the individual cells.

SUMMARY OF THE INVENTION

The present invention is directed to a fuel supply for fuel cells that has the ability to store information or memory relevant to the fuel contained in the supply.

The present invention is also directed to a fuel supply for fuel cells that has the ability to communicate relevant information to the fuel cell that it supplies and/or the electronic device that the fuel cell powers.

The present invention is further directed to a fuel supply for fuel cells that has the ability to receive and store relevant information from the fuel cell and/or the electronic device that the fuel cell powers.

In one embodiment, the present invention is directed to a fuel supply for a fuel cell comprising an outer casing containing fuel and an information storage device supported by the casing. The data stored on the information storage device is encrypted and is readable by a controller capable of decoding the encrypted data. The data is encrypted by a symmetric-key technique, and the encrypted data can be decoded by the same technique. Alternatively, the data is encrypted by a public-key technique and can be decoded by the same technique.

In another embodiment, the present invention is directed to a fuel supply for a fuel cell comprising an outer casing containing a fuel and an information storage device supported by the casing. The information storage device stores data selected from a group of information consisting of current ion level in the fuel, vibration tolerance for the cartridge, anti-counterfeit information, intellectual property information, security password, expiration date, shut-down sequence, hot swap procedure, fuel gage type, and fluid sensor information. The stored information is readable by a controller.

In another embodiment, the present invention is also directed to an information storage device associated with a fuel cell, wherein the information storage device comprises information for a hot swap procedure. This information storage device can be located on the fuel supply, the fuel cell or the electronic device that the fuel cell powers. The hot swap procedure comprises instructions for a controller to switch to an alternate power source for the electronic device and to instruct a pump for pumping fuel to the fuel cell to shut down in accordance to a predetermined sequence when a trigger event occurs.

The trigger event can be a removal of a fuel supply containing said fuel for the fuel cell when the electronic device is operational. The alternate power source comprises a battery or a reserve fuel chamber containing fuel for the fuel cell. The controller can write information to the information storage device using the alternate power source. The predetermined sequence comprises the step of running the pump using the alternate power source to pump fuel away from an interface between the fuel cell and a fuel supply containing fuel for the fuel cell.

In another embodiment, the present invention is also directed to a fuel cell system comprising a controller operatively connected to a first information storage device, a fuel regulator and a fuel cell comprising a membrane exchange member. The first information storage device is disposed on a fuel supply and contains information relating to the fuel supply, and the controller is capable of reading and writing to the information storage device. The fuel supply is in fluid communication with the fuel regulator, which contains at least a regulating valve, and the fuel regulator is in fluid communication with the fuel cell, such that fuel contained in the fuel supply is transportable to the fuel cell for conversion to electricity.

The fuel supply may have an internal pressure that is higher than atmospheric pressure. The filet regulator may also have a pump in fluid communication with the regulating valve.

When an electronic device, which the fuel cell powers, is turned on, the controller reads the first information storage device and confirms that the filet supply is compatible with the fuel cell. The controller then instructs the pump to pump fuel from the fuel supply. The controller can also regulate the flow rate through the regulator by setting the size of the opening in the regulating valve to regulate the flow rate. The controller can also set the pump rate to regulate the flow rate. The flow rate can further be controlled with a porous material, such as filler, foam, and membrane (such as Nomex® from DuPont).

The fuel cell system can also contain a second information storage device associated with the fuel regulator. The second information storage device contains information relating to the fuel regulator, and the controller is capable of reading and writing to the second information storage device.

The controller can determine the remaining fuel by reading a fuel gage that measures the remaining fuel in the fuel supply and writing the remaining fuel volume to at least one information storage device. The controller can also determine the remaining fuel by ascertaining the volume of fuel transported through the fuel regulator. This calculation uses the flow rate and the time period that fuel flows through the fuel regulator.

The controller can control the fuel concentration at the fuel cell by reading a fuel concentration from a concentration sensor operatively connected to the fuel cell and altering the flow rate through the fuel regulator to maintain the fuel concentration within a predetermined range. The fuel cell system may further comprise a mixing chamber for storing fuel transported through the fuel regulator and byproducts produced by the fuel cell reaction. The controller maintains the predetermined fuel concentration range by controlling the volume of fuel transported through the fuel regulator. The mixing chamber may have separate fuel and byproduct compartments, and the controller maintains the predetermined fuel concentration range by individually controlling the flow rate from each compartment to the fuel cell. The fuel compartment and the byproduct compartment may be contained in the same mixing chamber or may be positioned apart from each other.

The fuel cell system may also have a third information storage device associated with the fuel cell. The third information storage device contains information relating to the fuel cell and the controller is capable of reading and writing to the third information storage device.

The fuel cell system may further have an ion fuel filter, which may be disposed on the fuel supply, and an ion sensor readable by the controller. The controller can write the ion level to the first information storage device on the fuel supply, so that if the fuel supply has an unacceptable level of ions it would not use the fuel.

In one embodiment, the regulating valve has a flexible microporous membrane positioned spaced apart from an impervious surface and fuel is transported through the pores in the membrane and an opening in the impervious surface. When the flow rate of fuel exceeds a predetermined rate, the flexible microporous membrane is stretched such that at least a portion of the membrane contacts the impervious surface.

In another embodiment, the electricity produced by the fuel cell recharges a battery. The battery being charged can be a stand alone battery or be located inside an electronic device or in the cartridge.

In another embodiment, the fuel supply can be refilled by a refilling device having its own information storage device.

Additionally, the data stored on the information storage devices include write-protected data and rewritable data, and relates to the fuel, the fuel supply, the software for running the fuel supply, the fuel cell and the electronic device that the fuel cell powers. The stored data may also relate to the hardware and firmware, such as gages, associated with the fuel supply, the fuel cell and the electronic device.

The information storage devices can be an electrically erasable programmable read-only memory, among other electronic storage devices. The controller can be located in the fuel cell or in an electronic device that the fuel cell powers. The controller is connected to the information storage devices by electrical connections or by wireless connections. The controller may also have a security identification password required to access the data stored on the information storage devices.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
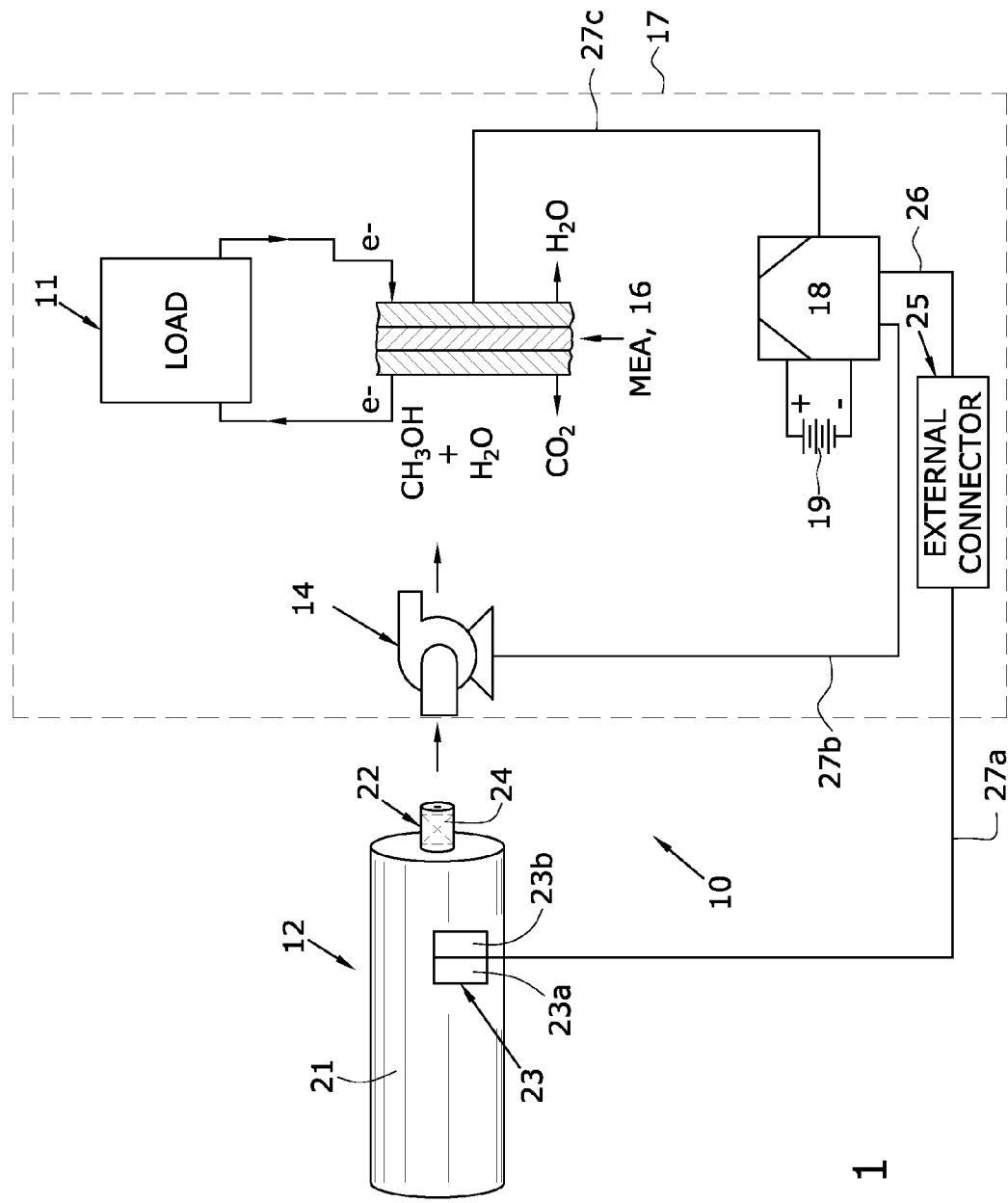
FIG. 1 is a schematic view of a fuel cell system including a fuel cartridge with an information storage device, a pump, and a MEA for powering an electronic device.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol, Methanol is usable in many types of fuel cells, e.g., DMFC, enzyme fuel cell, reformat fuel cell, among others. The fuel supply may contain other types of fuel cell fuels, such as ethanol or alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include aqueous sodium borohydride ($NaBH_4$) and water discussed above. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20-25. Other applications include storing traditional filets for internal combustion engines, and hydrocarbons, such as butane for pocket and utility lighters and liquid propane.

In accordance with one aspect of the present invention, the fuel supply possesses an ability to store information such as fuel content including fuel content during usage, fuel quantity, fuel type, anti-counterfeit information, expiration dates based on age, manufacturing information and to receive information such as length of service, number of refuels, and expiration dates based on usage. A more complete list of relevant information is listed below.

Suitable information storage devices include, but are not limited to, random access memory (RAM), read-only memory (ROW, programmable read-only memory (PROM), erasable programmable read-only memory (EPROM), electrically erasable programmable read-only memory (EEPROM), flash memory, electronically readable elements (such as resistors, capacitance, inductors, diodes and transistors), optically readable elements (such as bar codes), magnetically readable elements (such as magnetic strips), integrated circuits (IC chips) and programmable logic arrays (PLA), among others. The preferred information storage device includes PLA and EEPROM, and the present invention is described herein with the EEPROM. However, it is understood that the present invention is not limited to any particular type of information storage device.

Typically, information is stored as zeros (0) and ones (1) in the binary system. Groups of these binary digits form octal digits (groups of 3 binary digits) or hexadecimal digits (groups of 4 binary digits). Hexadecimal digits are commonly used for ease of reading information storage device.

EEPROM is a user-modifiable read-only memory that can be erased and rewritten or reprogrammed repeatedly throughout its useful life through the application of higher than normal electrical writing voltage on the same pin among other programming means. EEPROM does not need to be removed from the fuel supply to be modified. Advantageously, portions of an EEPROM can be write-protected, i.e., information originally written is saved and protected from the writing voltage, while other portions of the EEPROM can be repeatedly rewritten. Additionally, an EEPROM, similar to other ROMs, does not need electrical power to maintain the memory or data stored thereon. Hence, when an electrical device powers up, it relies on the information stored on an EEPROM to start-up and runs its programming. To erase and rewrite an EEPROM, a controller directs a predetermined voltage at a particular location of the EEPROM to store new information thereon.

EEPROM, as well as the other ROMs, are widely available commercially. Suitable EEPROMs are available from Cypress Semiconductor Corp. of San Jose, Calif., and Altera Corp. of San Jose, Calif., ATMEL Corporation of Hayward, Calif. and Microchip Technology Inc. of Chandler, Ariz., among others.

Relevant information to be stored on information storage devices includes protectable information and rewritable information. Protectable information, which cannot be erased, includes, but is not limited to:

(1) type of cartridge,
(2) date the cartridge was manufactured,
(3) lot number for the cartridge,
(4) sequential identification number assigned to the cartridge during manufacturer,
(5) date the information storage device was manufactured,
(6) lot number for the information storage device,
(7) sequential identification number assigned to the information storage device,
(8) machine identification number for the cartridge and/or storage device,
(9) shift (i.e., time of day) during which the cartridge and/or storage device were produced,
(10) country where the cartridge and/or storage device were produced,
(11) facility code identifying the factory where the cartridge and/or storage device were produced,
(12) operating limits, including but not limited to temperature, pressure, vibration tolerance, etc.
(13) materials used in manufacturing,
(14) anti-counterfeit information,
(15) fuel information, such as chemical formulation, concentration, volume, etc.,
(16) intellectual property information, including patent numbers and registered trademarks,
(17) safety information,
(18) security password or identification,
(19) expiration date based on date of manufacturing,
(20) shut-down sequence,
(21) hot swap procedure,
(22) recycling information,
(23) reactant information,
(24) fuel gage type, and
(25) fluid sensor information, Rewritable information includes, but is not limited to:

(1) current fuel level and/or current ion level in the fuel,
(2) number of ejections/separations of the cartridge from the electrical device and/or MEA or number of times that the cartridge was refilled,
(3) fuel level on ejection/separation of the cartridge from the electrical device and/or MEA,
(4) number of insertions/connections of the cartridge to the electrical device and/or MEA,
(5) fluid level on insertion/connection of the cartridge to the electrical device and/or MEA,
(6) current operation status including rate of power consumption, acceptance/rejection of a particular electronic device,
(7) maintenance status and marketing information for future cartridge designs,
(8) triggering events,
(9) expiration date based on actual usage;
(10) efficiency of the system,
(11) operational history of the fuel cell system, such as temperatures and pressures during selected time periods (e.g., at start-ups and shut-downs or periodically), and
(12) operational history of the electronic devices, such as number of digital pictures per cartridge, maximum torque for power tools, talking minutes and standby minutes for cell phones, number of address look-ups per cartridge for PDAs, etc.

As illustrated in the accompanying drawings and discussed in detail below, the present invention is directed to a fuel cell or fuel cell system 10 for powering a load 11. Load 11 is typically an electronic device that fuel cell 10 powers. Referring to FIG. 1, the first embodiment of the fuel cell 10 includes fuel cartridge 12, pump 14, and MEA 16. The MEA typically comprises an electrolyte layer or a proton exchange membrane (PEM), and the MEA is typically positioned between two bipolar plates. In an alternative embodiment, MEA 16 may also be removable from housing 17 to allow repair, refurbishment or replacement thereof. Load or electrical device 11 is the external circuitry and associated functions of any useful consumer electronic devices. In the figures, for convenience electrical device 11 is shown to be inside fuel cell 10. However, typically fuel cell 10 is contained within electrical device 11. The electronic device may be for example, mobile or cell phones, calculators, power tools, gardening tools, personal digital assistants, digital cameras laptop computers, computer games systems, portable music systems (MP3 or CD players), global positioning systems, and camping equipment, among others. The free electrons (C) generated by MEA 16 flow through electronic device 11. In the present embodiment, housing 17 supports, encloses and protects electronic device 11 and its electronic circuitry, pump 14, and MEA. Housing 17 is preferably configured such that fuel cartridge 12 is easily removable from a chamber in housing 17 by the consumer/end user.

Controller 18 is preferably provided within housing 17 to control the functions of electronic device 11, cartridge 12, pump 14 and MEA 16, among other components. Preferably, the housing also supports at least one optional battery 19 for powering various components of fuel cell 10 and electronic device 11 when the MEA is not operating or during system start-up. Alternatively, optional battery 19 powers controller 18 when cartridge 12 is empty or when the fuel cell/MEA is off. Optional battery 19 can be replaced by or used in conjunction with solar panels.

With further reference to FIG. 1, fuel cartridge 12 comprises an outer shell or outer casing 21 and a nozzle 22. Outer casing 21 supports information storage device 23. Nozzle 22 houses shut-off valve 24 (shown in phantom), which is in fluid communication with the fuel stored within the cartridge. Shut-off valve 24 in turn is connected to pump 14.

Cartridge 12 can be formed with or without an inner liner or bladder. Cartridges without liners and related components are disclosed in co-pending U.S. patent application Ser. No. 10/356,793, entitled "Fuel Cartridge for Fuel Cells," filed on Jan. 31, 2003. The '793 application is incorporated herein by reference in its entirety. Cartridges with inner liners or bladders are disclosed in commonly owned, co-pending U.S. patent application Ser. No. 10/629,004, entitled "Fuel Cartridge with Flexible Liner," filed on Jul. 29, 2003. The '004 application is also incorporated herein by reference in its entirety.

Suitable shut-off valves 24 are fully disclosed in commonly owned, co-pending patent application Ser. No. 10/629,006 entitled "Fuel Cartridge with Connecting Valve," filed on Jul. 29, 2003. This patent application is also incorporated herein by reference in its entirety. Suitable pumps 14 are fully disclosed in the '793, '004 and '006 applications. A preferred pump is a piezoelectric pump. Suitable piezoelectric pumps include those available from PAR Technologies, LLC of Newport News, Va. Piezoelectric pumps have no moving parts and are lightweight, compact, rugged, quiet and efficient. These pumps have excitation voltages of greater than about 50V and current draw, for example from as low as about 15 milliamps up to about 130 milliamps at an input voltage from about 2.2 VDC up to about 12 VDC. The flow rate for piezoelectric pumps is from about 10 ml/hour up to about 900 ml/hour at pressures in the range of about 0 to about 5 psi. The size of the pump is from about 0.5 inch$^2$ up to about 1.5 inch$^2$ by less than about 0.5 inches thick. The piezoelectric pump can be constructed from materials that are compatible with the fuels to be used with fuel cells and fuel cartridges. These pumps also operate in a wide range and have long cycle life.

In the present embodiment, pump 14 is external to cartridge 12 and is secured within housing 17. As a result, when cartridge 12 is removed from housing 17, pump 14 remains within housing 17. This allows the cartridge to be inexpensive and be disposable. Alternatively, pump 14 can be coupled to cartridge 12. Pump 14 can be omitted and cartridge 12 can be pressurized to drive the fuel from cartridge 12 to the fuel cell.

Information storage device 23 may be located anywhere on the cartridge for example on the top, bottom, or sides of the exterior surface of the outer casing 21. In the alternative, the device 23 can be located in the interior of the cartridge. For example, when the cartridge has "an open structure" configuration as disclosed in the '004 application, the device may be located on an interior surface of the outer casing.

Information storage device 23 is preferably an electrical storage device, such as an EEPROM memory chip discussed in detail above. Preferably, information storage device 23 generally has a substrate (not shown) formed of a "potting material," an integrated circuit memory chip (not shown), and etched or printed layers or strips of electrical circuitry or contacts (not shown). The integrated circuit memory chip (not shown) can be connected to the substrate (not shown) with a plurality of pins, such as in an external electronic connector.

Information storage device 23 is connected to controller 18 through external connector 25. External connector 25 is in electrical communication with the controller 18 via link 26.

When cartridge 12 is loaded into housing 17, the electrical contacts on information storage device 23 are connected to the external connector 25 as represented by the link 27a. Alternatively, the connection is a wireless system that is capable of transmitting electrical signal between information storage device 23 and controller 18. Suitable wireless transmission systems include Blue Tooth technology, radio frequency, infrared rays, etc.

Information storage device 23 can have any particular memory size. The memory size is determined by the amount of data needed to be stored. Suitable memory size typically ranges from about 128 bytes to about 512 K bytes. Memory sizes of 1 M bytes and higher are also commercially available and are usable in the present invention. Information storage device 23 is also not limited to any particular dimensions so long that it can fit on to the fuel cartridges Information storage device 23 preferably includes portions 23a and 23b. Portion 23a is pre-programmed or setup by the manufacturer to include read-only (write protected or protectable) data, discussed above. Controller 18 can read the data in portion 23a of information storage device 23. However, the controller 18 cannot modify or erase the read-only data in portion 23a. Portion 23b is programmed or setup by the manufacturer to include rewritable data, discussed above. Controller 18 can read and write/erase the data in portion 23b. Portions 23a and 23b are electrically connected to link 27a via conventional electrical wires or printed circuit boards, etc. known by those of ordinary skill in the art or by the wireless connections listed above.

Figure 2:
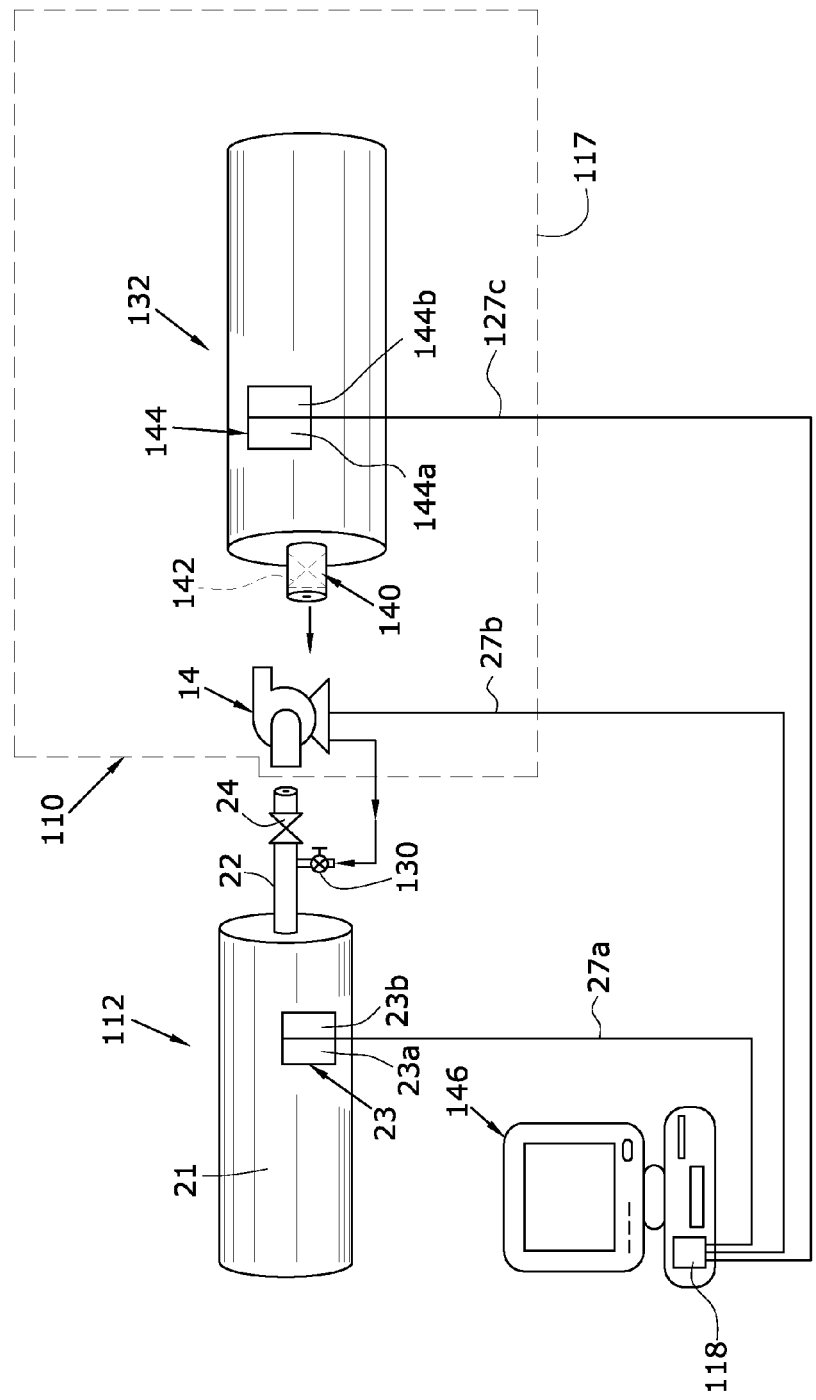
FIG. 2 is a schematic view of a fuel cell system including the fuel cartridge with the information storage device, the pump, and a refilling device with an information storage device.

FIG. 2 shows an alternative embodiment of a fuel cell 110. In fuel cell 110, refillable cartridge 112, pump 14 and controller 18 are similar to the previously discussed components except that outlet 22 of cartridge 112 further includes a refill valve 130. Refill valve 130 is discussed in the '793 application, and in commonly owned, co-pending patent application Ser. No. 10/725,264, entitled "Method and Apparatus for Filling a Fuel Container," filed on Dec. 1, 2003, which is incorporated herein by reference in its entirety.

Fuel cell 110 further includes refilling device 132, which is a fuel supply containing additional fuel from which the cartridge 112 can be refilled. Refilling device 132 includes outlet 140 with shutoff valve 142 (shown in phantom) therein. Shutoff valve 142 can be configured to connect to shutoff valve 24. Shut-off valves 24 and 142 can also form a two-component valve discussed in the '006 application. Refilling device 132 may include information storage device 144. Information storage device 144 may include read-only and rewritable portions 144a and 144b similar to information storage device 23. In the present embodiment, housing 117 supports refilling device 132 and pump 14. Housing 117 is preferably configured such that fuel cartridge 112 is easily removable or disconnected from a chamber in the housing 117 by the consumer/end user.

Controller 118 is preferably provided within an electronic device or fuel cell, such as personal computer 146. Controller 118 controls the functions of the cartridge 112, pump 14 and the refilling device 132. Alternatively, housing 117 may include the controller 118. Information storage device 23 is operatively associated with a controller 118 via line 27a. Controller 118 is also operatively associated with pump 14 via line 27b and with information storage device 144 via line 127c. Lines 27a, 27b, and 127c preferably provide one-way or two-way communication between the associated devices and may include electrical contacts or connectors and external contacts as known by those of ordinary skill in the art. Lines 27a, 27b and 127c can be replaced by wireless transmission systems, discussed above.

Pump 14 may be coupled to cartridge 112 or to refilling device 132, or can be separate from both of these components. Regardless of the location and configuration of pump 14, it may include a separate information storage device as discussed below. Alternatively, when the pump is integral with the cartridge or refining device, the pump information can be stored on information storage device 23 or 144.

Controller 18 or 118 may access protectable information during refilling of the cartridge or during operation of load/electronic device 11 to ensure efficient operation of the electronic device 11. For example, cartridge information can be accessed upon insertion of the cartridge and controller 18 can assure that cartridge 12 is compatible with electronic device 11. If the cartridge is compatible, electronic device 11 can continue to function normally. If the cartridge is not compatible, controller 18 or 118 can issue a visual or audible signal and automatically prevent operations.

Other useful protectable information accessible by the controller includes vibration frequency or range of frequencies that information storage device 23 can tolerate, Vibration tolerance can be from about 20 Hz to about 40 Hz. During operation, the electronic device may experience background operation caused by component vibrations. This vibration should be in a range that the information storage device can tolerate. The controller can also record the actual vibrations or the peak vibrations caused by the electronic device to the information storage device, so that this information can be used by designers to debug or troubleshoot the cartridge, the fuel cell or the electronic device.

Manufacturing information stored on information storage device 23 can help the controller to analyze the performance of the fuel cartridge, to identify recalled or expired cartridges and to ensure that the proper fuel cartridge is connected to electronic device 11. The cartridge's volume can also be stored and accessed.

Accessible safety information can include, for example, whether the cartridge is suitable for use on an airplane. The electronic device may display a message when a particular keystroke on the electronic device is activated or at a predetermined time, such as power up, relaying any safety information. Additionally, when the remaining fuel is below a predetermined low fuel threshold, the electronic device may display a "low fuel" message and/or turn off to conserve fuel. Additionally, when such a message is displayed the controller can assist a user in reordering fuel (by activating an internet connection to the cartridge supplier) and/or provide reorder information to the user.

In accordance with another aspect of the present embodiment, an information storage device can store read-only or protectable pump information, such as (1) type of pump 14; (2) the date pump 14 was manufactured, (3) the lot number for pump 14; (4) the sequential identification number assigned to pump 14 during manufacturer; (5) the country where pump 14 was produced; (6) the facility code identifying the factory where pump 14 was produced; (7) and the pump rate. Such information can be stored on information storage device 23 or on the pump's own information storage device.

The first through sixth data listed above can be used to determine the quality of various manufacturing facilities and troubleshoot manufacturing issues. The controller 18 or 118 can use the pump rate, which may be a variable pump rate, along with the time the pump is operating and the current fuel level to determine the amount of fuel used, the amount of fuel remaining in the cartridge, remaining time until the cartridge is refilled. Alternatively, the voltage, current and power/energy used by the pump can be used to ascertain the amount of fuel the pump is pumping. Since the fuel volume is determined by flow rates, the fuel volume can be determined regardless of the orientation of the cartridge and can be determined without sensors being in direct contact with or submersed in the fuel. Information storage device 23 can be programmed such that the current fuel amount is stored in a new location and previous fuel amounts are not written over, so that there is a permanent record of the fuel consumption. Alternatively, the controller can determine the remaining fuel from fuel gages and write this information on to information storage device 23. Fuel gages that can be electronically read by the controllers are fully disclosed in commonly owned, co-pending patent application Ser. No. 10/725,236, entitled "Fuel Gage for Fuel Cartridges," filed on Dec. 1, 2003. This co-pending patent application is incorporated herein by reference in its entirety.

Other protectable cartridge information includes (1) an expiration date of cartridge 12; (2) a security identification password; (3) shutting down sequence and (4) computer code language for a safe hot swap operation.

The expiration date of cartridge 12 can be based on the manufacture date of the cartridge. Alternatively, the expiration date of the cartridge can be based on the actual usage of the cartridge or the number of refills. Regardless of how the expiration date of cartridge 12 is set, the controller 18 or 118 can access or update the expiration date. If the expiration date has passed, the controller can prevent the use of the cartridge. Additionally and optionally, the electronic device and/or refilling device can alert the user with a visual or audible signal that the cartridge has expired. An example of a visual signal is a message on a screen of the electronic device or PC 146.

The security identification password can be a sequence of alphanumeric characters or hexadecimal digits. Controller 18 or 118 can check the security identification password with at least one predetermined confirmation password to determine whether cartridge 12 is a counterfeit. If the security identification password matches the confirmation password, the electronic device 11 and/or refilling device 132 will operate normally. If the security identification password does not match the confirmation password, the appropriate controller can prevent the use of cartridge 12. The confirmation password can be stored on the electronic device or electronic device 11, or in the controller. Additionally and optionally, controller 18 or 118 can alert the user with a visual or audible signal that the cartridge is not acceptable and the reason why it is not accepted. An example of a visual signal is a message on a screen of the electronic device, where the electronic device is a computer or PDA.

The information storage device may be programmed such that when the electronic device, the fuel cell device and/or refilling device are turned off, fuel is pumped away from the outlet 22 in case cartridge 12 is removed. As a result, if cartridge 12 is removed, fuel is not present near the outlet. Additionally, information storage device 23 may contain a hot swap procedure. A hot swap procedure can occur when cartridge 12 is removed from the housings 17 or 117 white the electronic device 11 is on. To remove cartridge 12 the user typically actuate an ejection button (not shown) on the electronic device, the fuel cell device and/or refilling device. If this ejection button is actuated when the electronic device, the fuel cell device and/or refilling device is active, then in accordance with another aspect of the present invention the controller executes the hot swap procedure that may be stored on information storage device 23, 144.

For example, information storage device 23 can include computer code language with the verbs semaphore. "lock" and semaphore. "unlock" or other suitable flags. The semaphore. "lock" is a flag used to indicate that a routine cannot proceed if a shared resource is already in use by another routine. The semaphore. "lock" verb or other flags triggered by the hot swap is initiated when the ejection button is actuated white the power is still on. When this flag is encountered by the controller 18 or 118, the controller communicates with fuel cell or MEA 16 or refilling device 132, pump 14, and cartridge 12. Fuel cell or MEA 16 or refilling device 132 is notified that cartridge 12 is about to be removed and switches over to another power source such as a battery or reserve fuel contained in the mixing chamber or another internal fuel chamber, etc. Pump 14 is notified to go through a shutdown cycle, which should help to reduce the amount of fuel left at the interface of the valve 24 by leaving pump 14 running for several seconds after the ejection button is actuated. During ejection, power can be allowed to flow to certain circuitries, so that information storage device 23 can be written on with information regarding fuel level, security issues, number of removals, or information relevant to the shutdown sequenced stored thereon can be accessed. This should improve the process of removing the cartridge from the electronic device and/or refilling device in a hot swap operation. When the shutdown cycle is complete, the semaphore, "unlock" verb or other flags is set and the controller 18 or 118 allows the cartridge 23 to be ejected from the electronic device, fuel cell device and/or refilling device. The semaphore status or other flags can also be used to cause automatic data backup in case the system unexpectedly locks up or looses power.

Any portion of the read-only data that a manufacturer considers proprietary may be encrypted so that another manufacturer cannot read the data and use it for purposes, such as manufacturing competing substitutes. Suitable encryption methods include, but are not limited to symmetric-key encryption and public-key encryption.

In symmetric-key encryption, the electronic device has a secret key or code that it can use to decode the encrypted information. The secret key or code is pre-installed in the electronic devices that are designed to accepted pre-selected fuel supplies. The information storage device on the fuel supplies is then encrypted so that the electronic device using the secret key can decode this information.

In public-key encryption, a secret key is pre-installed on the electronic device, and this key is made public to compatible fuel supplies. The information stored on the information storage device on the fuel supplies is encrypted with a symmetric-key, and the symmetric key is encrypted with this public key. To decode the information stored on the information storage device, the electronic device uses its secret key to decode the symmetric-key, and then uses the symmetric key to decode the information. Suitable public-key/private-key encryption is commercially available as Pretty Good Privacy (PGP) software.

The present invention is not limited to the aforementioned protectable or read-only manufacturing, fuel, pump, and operations information and any one or combination of these categories of information can be used in the present invention. In addition, within the categories of information any one or combination of exemplary data listed above can be used. Some or all of the read-only data discussed above may be used with the information storage device 144 for use with the refilling device 132 (shown in FIG. 2).

In accordance with another aspect of the present invention, rewritable information can be recorded on portion 23b of the information storage device, such as current operations, marketing, maintenance, and other triggering information. Current operations information may include power consumption and/or acceptance/rejection data for a particular electronic device.

Marketing and maintenance information can be used for the design of future cartridges, fuel cells or electronic devices. This data can be written to information storage device incrementally by the controller 18 or the information can be written to a memory storage device for the electronic device upon a predetermined event, such as reaching the low fuel threshold. Marketing information may include data indicative of how the electronic device was used. For example, data related to the fuel cell or fuel cartridge, such as how often the electronic device is turned on and how long it remains on. This information can be used to evaluate the fuel cartridge capacity and/or the low fuel threshold. Another example of marketing information is the number of times a particular feature of the electronic device is used.

Maintenance information may include failure modes or how many cartridges are installed prior to a line failure. Other useful information includes the fuel cell's efficiency and performance. When the cartridge is returned for recycling, this data can be used by designers to improve these components and to understand the consumer use pattern.

Triggering information can be data on information storage device 23 that is read by controller and prompts the controller 18 to perform various functions. After the electronic device has been turned on and initialized, the trigger data may include data that is accessed prior to the onset of normal electronic device operations. For example, due to the stored fuel level electronic device 11 or the fuel cell may increase or decrease power consumption and/or display a message. The trigger data may include data that is accessed after the onset of normal electronic device operations, such as data indicative of new/related product and service offerings, software/hardware upgrades or other related product/marketing information, instructions concerning future triggers, fuel cartridge order information, or advertising or marketing materials unrelated to the electronic device or the fuel cell.

Other rewritable information includes electronically readable fuel gage information obtained from fuel gages, discussed above, readable ion level obtained from ion gages, discussed below, among others. The present invention is not limited to the aforementioned rewritable fuel and operations information and any one or combination of the above categories of information can be used in the present invention. In addition, within the categories of information any one or combination of exemplary data listed above can be used. Some or all of the rewritable data discussed above may be used with the information storage device 144 for use with the refilling device 132 (shown in FIG. 2).

Figure 3:
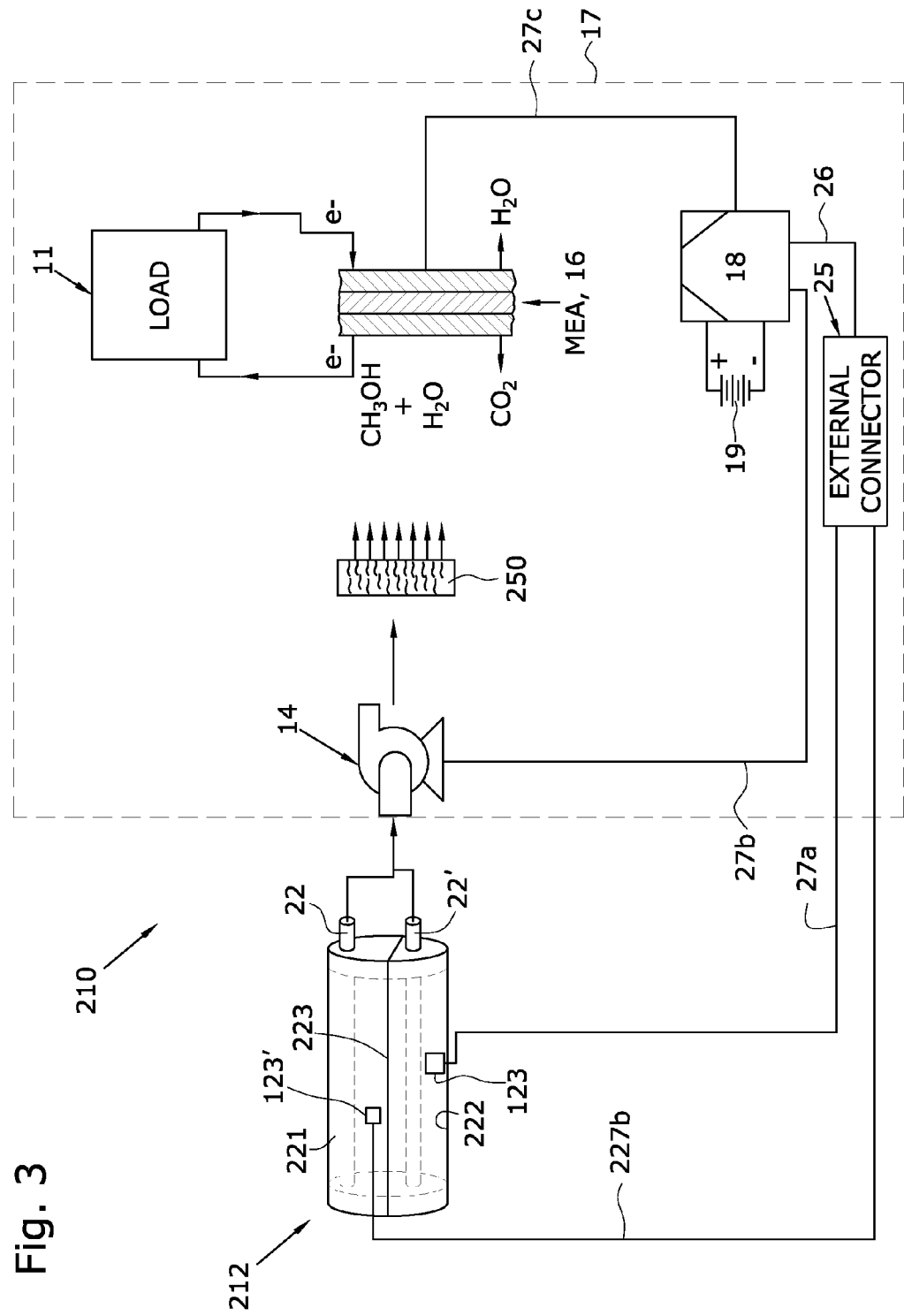
FIG. 3 is a schematic view of a fuel cell system including a fuel cartridge with multiple chambers each with an information storage device, a pump, and a MEA for powering an electronic device.

FIG. 3 shows an alternative embodiment of a fuel cell 210. In fuel cell 210, pump 14 and controller 18 are similar to the previously discussed components except external connector 25 includes a line 227b. Cartridge 212 includes an outer casing 221 for defining a first chamber 222 and a second chamber 223. The first and second chambers may contain a first and second fuel, respectively, that are the same or that have different properties such as concentrations. The first and second chambers may contain first and second fuels, respectively, that are different. The first and second chambers may contain fuel and water, respectively. The first and second chambers may contain fuel and byproducts from MEA 16, respectively. The cartridge 212 preferably has a single information storage device or may include two information storage devices 123 and 123' similar to the information storage device 23. The second device 123' is connected to the controller 18 via line 227b. Consequently, the controller 18 can select the fluids in the chambers 222 and 223 to optimize the operation of electronic device 11. The chambers 222 and 223 can be formed by walls of the cartridge or by inner liners or bladders as discussed in the '793 application and the '004 application, respectfully. The cell 210 further includes a mixing chamber 250 in fluid communication with outlets 22 and 22' of chambers 223 and 222, respectively, to mix the fuels. A suitable mixing chamber is disclosed in the '793 application.

Figure 4:
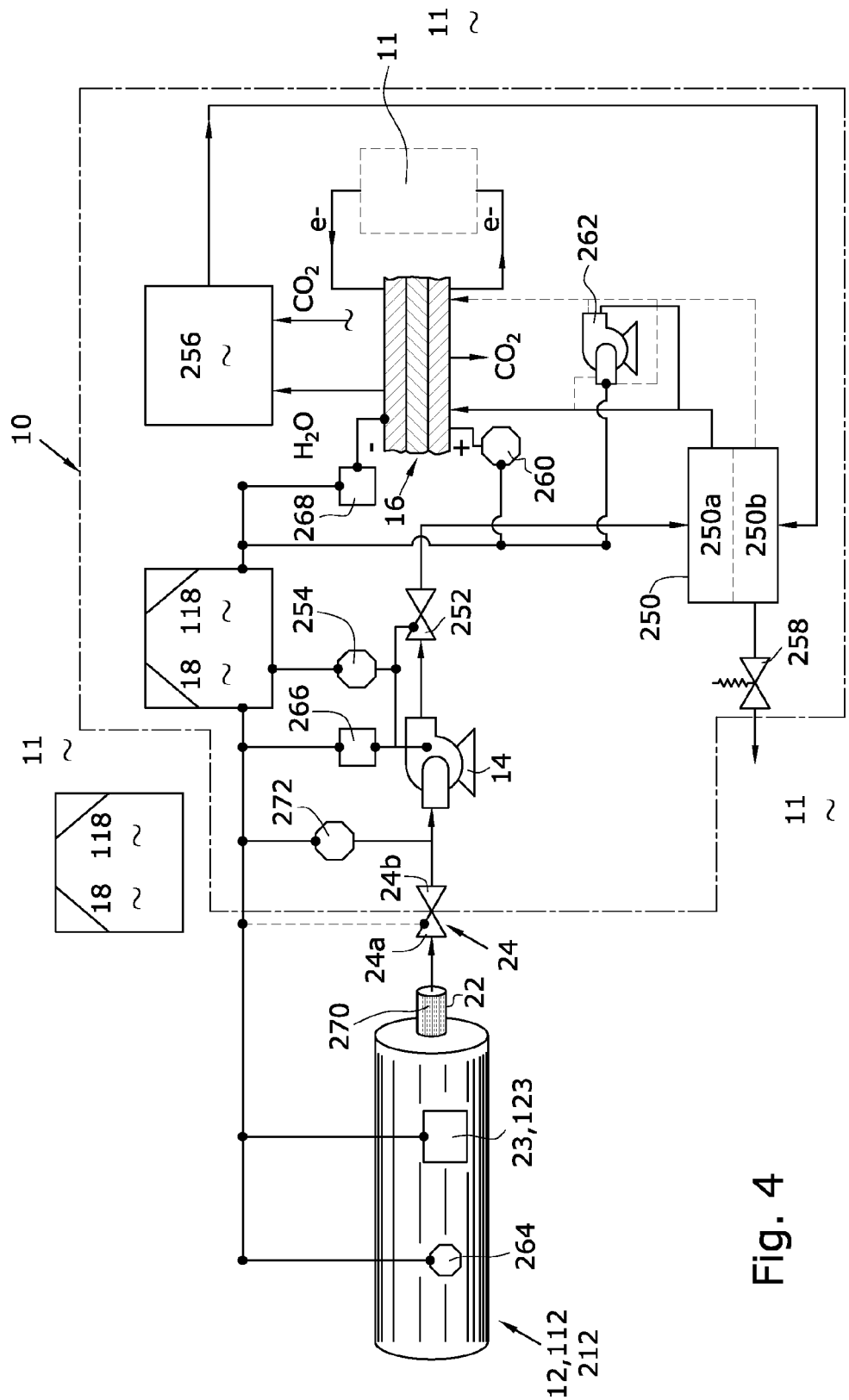
FIG. 4 is a schematic view of another fuel cell system of the present invention.

FIG. 4 illustrates another embodiment of the present invention, wherein information storage devices are used in the control and operation of a direct methanol fuel cell, the fuel cartridge and the electronic device the fuel cell powers. HG. 4 contains two sets of connecting lines. The first set of connecting lines comprises fluid, i.e., liquid and gas, lines, which have arrows to show the direction of flow. The second set of connecting lines comprises electrical lines, which have darkened circles at the intersections to show electrical connectivity. While this embodiment is described with respect to direct methanol fuel cell, it is understood that this embodiment is suitable for any fuel cell.

Cartridge 12, 112, 212 is connected to fuel cell 10, which powers electronic device 11. Electronic device 11 is typically larger than the fuel cell and usually houses the fuel cell. In FIG. 4, electronic device 11 is shown schematically to surround fuel cell 10. It is also represented by a box drawn by broken lines and is powered by the electrical current produced by MEA 16.

With respect to the fluidic circuit, as discussed above, the fuel cartridge is connected to valve 24, which preferably is a two-component valve. Valve component 24a is attached to the cartridge and valve component 24b is connected to pump 14. Each valve component is capable of forming a seal when the fuel cartridge is separated from the fuel cell. Two component valves are fully disclosed in the '006 application. Inside fuel cell 10, valve component 24b may directly connect to pump 14 and provides a seal for pump 14 when the fuel cartridge is disconnected. Additionally, valve component 24b may be attached to other components. Pump 14 is connected to valve 252, which functions as a flow regulating device, and the flow rate through pump 14 and valve 252 can be measured with flow meter 254, such as a Venturi meter or other electronic flow meters or through a concentration meter in the mixing chamber. Fuel is then pumped into mixing chamber 250. From mixing chamber 250, fuel/water mixture is pump directly to MEA 16 to generate electricity to power electrical device 11. Liquid and gas byproducts, e.g., water and carbon dioxide, can be pumped or flowed under pressure from the carbon dioxide gas to byproduct chamber 256. The water byproduct is then transported back to mixing chamber 250. Mixing chamber 250 has relief valve 258 to vent the gas byproduct outside the fuel cell. Relief valves can be poppet-type valve disclosed in the '004 application. The liquid byproduct is mixed with fuel in mixing chamber 250 to achieve an optimal fuel concentration. Fuel concentration is measured by fuel concentration sensor 260, and these sensors are disclosed in United States patent publication nos. 2003/0131663 and 2003/0134162 and in U.S. Pat. Nos. 6,254,748 and 6,306,285. These references are incorporated by reference herein.

Figure 6:
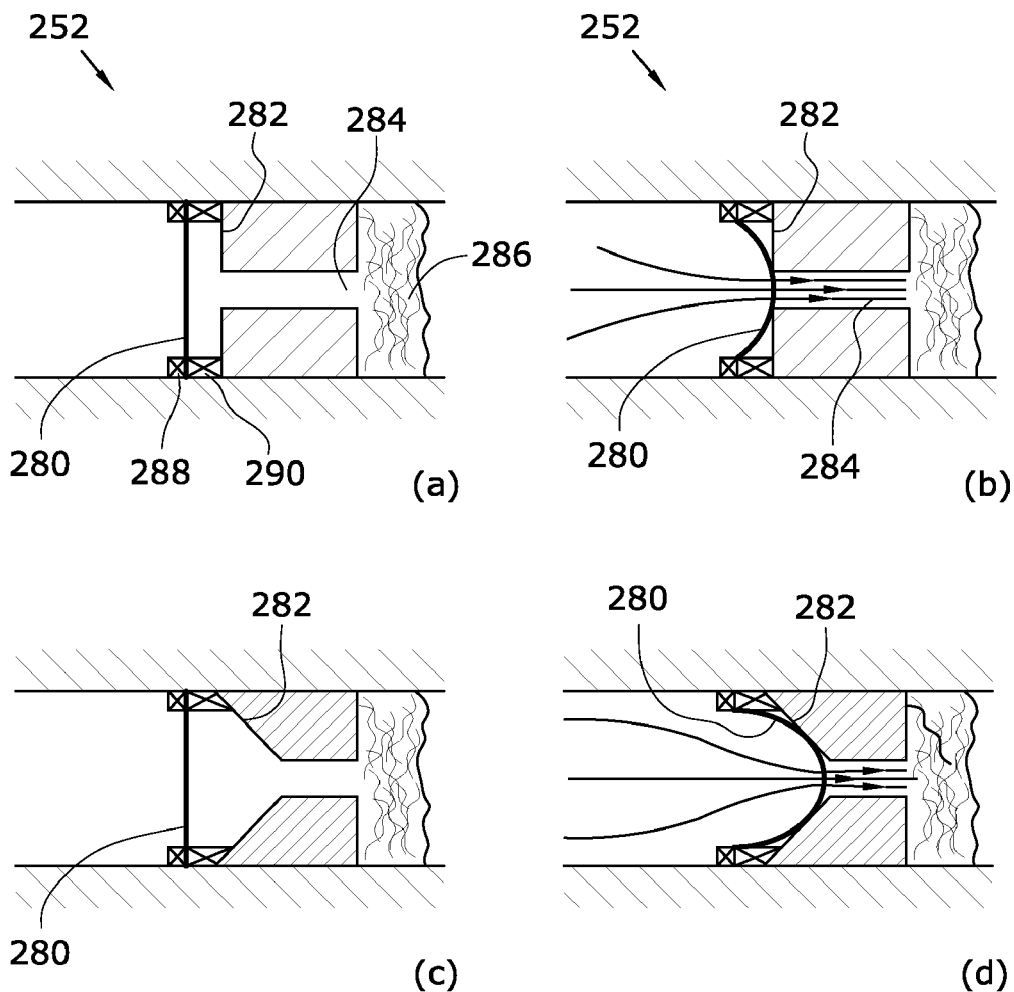
FIGS. 6(a)-(d) are partial cross-sectional views of two embodiments of a regulating valve in accordance to the present invention.

When pressurized fuel supplies are used, pump 14 may be omitted. In this embodiment, regulating valve 252 regulates the flow of fuel to MEA 16. Regulating valve 252 may have a variable orifice that can be opened at a predetermined diameter to regulate flow. Alternatively, as shown in FIGS. 6(a)-(d), regulating valve 252 may have a control device comprising flexible microporous membrane 280 and an impervious surface 282 substantially spaced from each other. The space between membrane 280 and impervious surface 282 shown FIGS. 6(a)-6(d) is enlarged for clarity. In regulating valve 252, this gap is considerably smaller. Fuel is allowed to flow through the pores in flexible membrane 280 and through at least one opening 284 in impervious surface 282. When the fuel flow is below a predetermined level, the fuel flows normally through the flexible microporous membrane, and the flexible membrane may deform, but continues to be substantially spaced from the impervious surface, as illustrated in FIGS. 6(a) and 6(c). When the fuel flow rate is above the predetermined level, the pressure on the flexible membrane causes the membrane to deform so that it contacts the impervious surface, and fuel can no longer flow through the microporous membrane where it contacts the impervious surface, as illustrated in FIGS. 6(b) and 6(d). As discussed below, deformation of the flexible microporous membrane includes, but is not limited to, stretching and bending. As pressure on the flexible membrane increases, more pores contact the impervious surface to reduce the area on the membrane available to fuel flow and flow is restricted. Similar regulating valves are disclosed in U.S. Pat. Nos. 4,496,309 and 4,560,345. These two patents are incorporated by reference herein in their entireties.

As shown in FIGS. 6(a) and 6(b), microporous membrane 280 is fixedly attached to the sidewall of the valve body. Stops 288 and 290 maintain membrane 280 in this fixed position. As the fuel flow increases, the membrane is deformed and moved until it contacts the substantially flat impervious surface 282. The less contact between the membrane with the impervious surface results in greater flow. More than one flow channel 284 may be present and flow channels 284 may have different diameters. Furthermore, impervious surface 282 may have a predetermined roughness, such that higher roughness produces less sealing and allows more flow. Additionally, filler or retention material 286 can be placed downstream of flow channel(s) 284 to further regulate the flow of fuel. The microporous membrane can also be used as the filler to prevent significant release of fuel if the valve is unintentionally opened. Alternatively, impervious surface 282 can have a conical profile as shown in FIGS. 6(c) and 6(d), spherical profile or other profiles.

Figure 7:
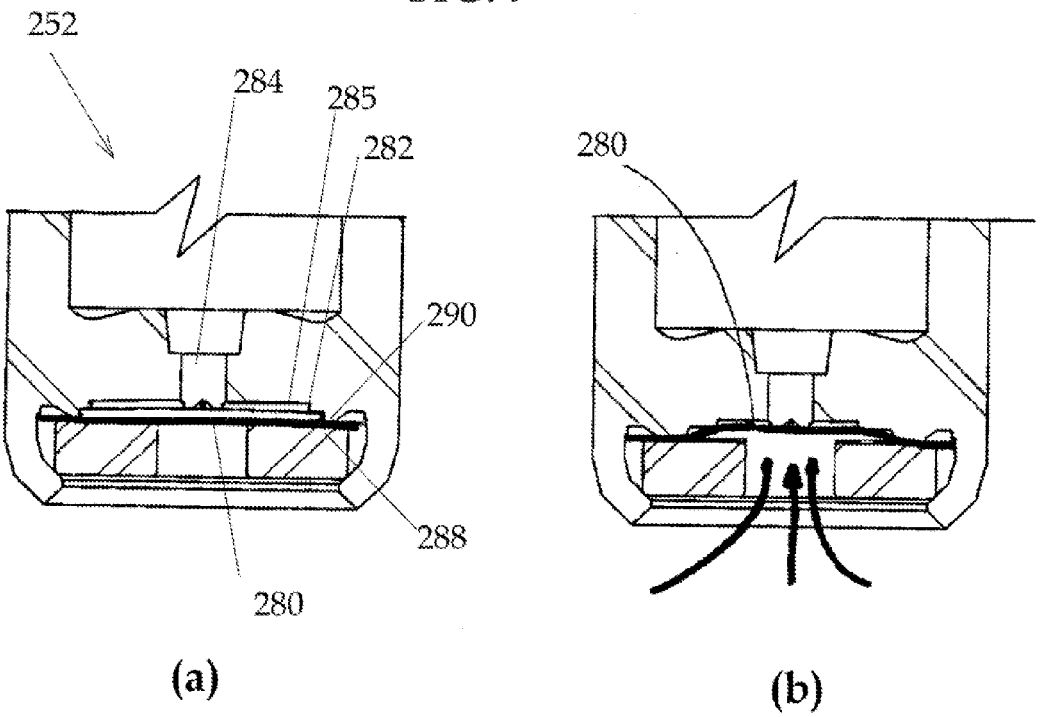
FIGS. 7(a)-(m) are partial cross-sectional views of additional embodiments of the regulating valve in accordance to the present invention.
Figure 7:
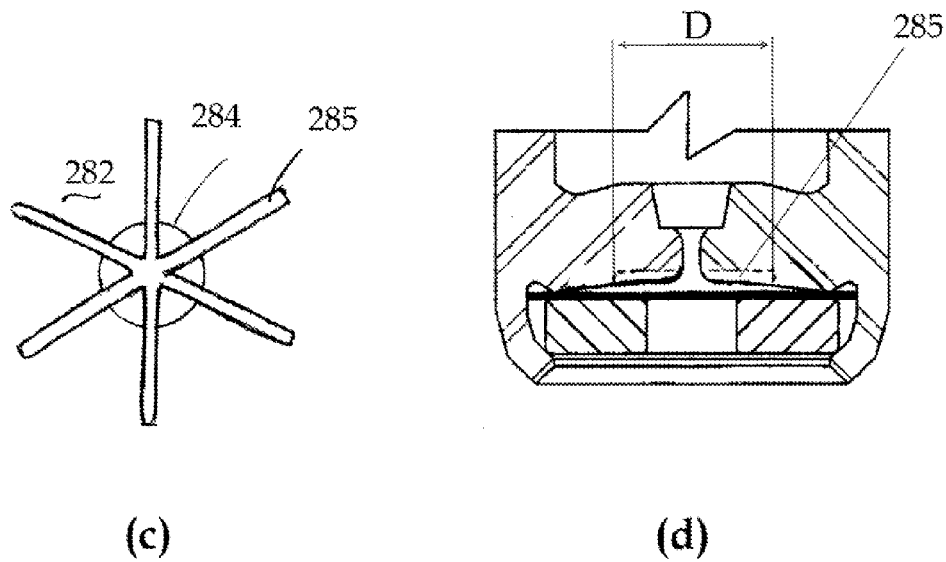
Figure 7:
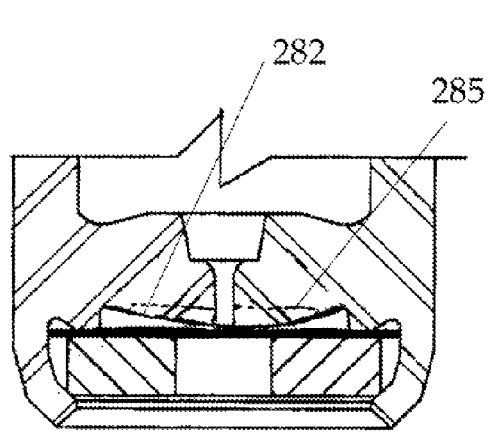
Figure 7:
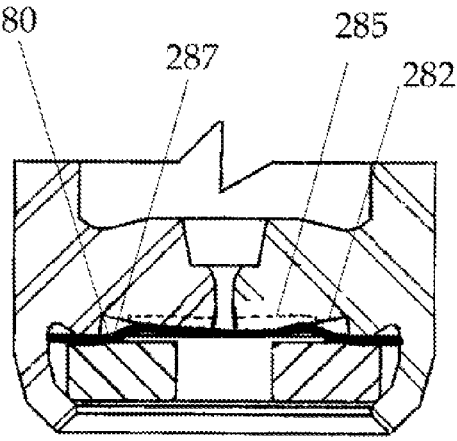
Figure 7:
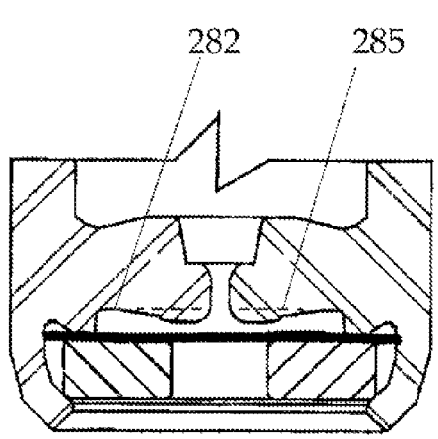
Figure 7:
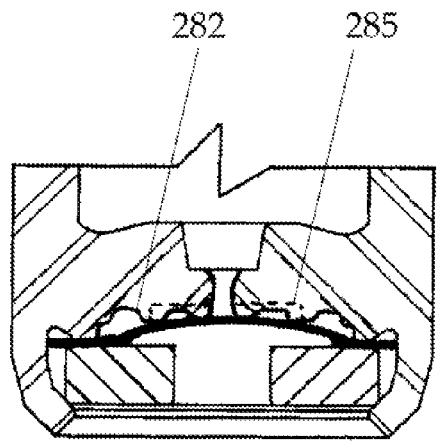
Figure 7:
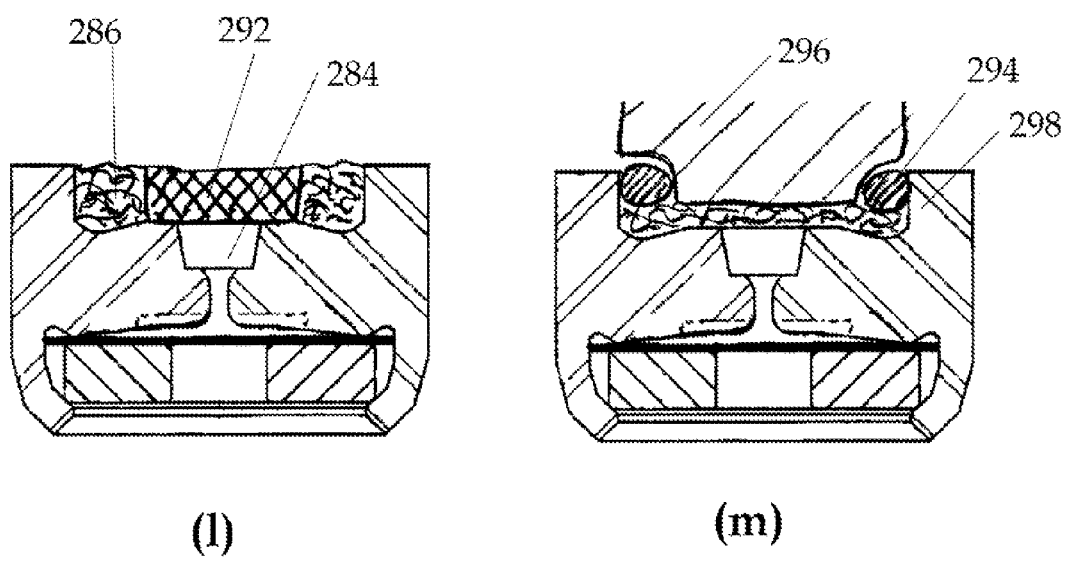

An alternative embodiment of regulator valve 252 is shown in FIGS. 7(a)-(m). Referring to FIGS. 7(a) and (b), regulator valve 252 also comprises microporous membrane 280 positioned spaced apart from impervious surface 282. Stops 288 and 290 maintain membrane in this fixed position. At least one flow channel 284 is disposed downstream of impervious surface 282 to allow fuel to flow through the regulator valve. A multiple-legged flow conduit or star 285 is etched or otherwise defined on impervious surface 282, and is in flow communication with channel 284, as shown in FIG. 7(c). Fuel flowing passed microporous membrane 280 is collected in flow conduit 285 before reaching flow channel 284.

As depicted in FIG. 7(b), as the flow rate or pressure increased above a threshold level, membrane 280 deforms and coming into contact with impervious surface 282, and only the portions of membrane 280 that are opposite to flow conduit 285 and not in contact with impervious surface 282 are open to fuel flow.

The flow rate can also be controlled by changing the diameter D or surface area of flow conduit 285, which is shown in broken lines in FIGS. 7(d)-(m), As shown in FIG. 7(d), the diameter is shortened to limit flow. Similar to the embodiment shown in FIGS. 6(a)-(d), impervious surface can be concave, as illustrated in FIGS. 7(e)-(f), convex, or both concave and convex, as illustrated in FIG. 7(g). Impervious surface 282 may also have uneven surface, as illustrated in FIG. 7(h).

Depending on the configuration of the regulator valve, open zone 287 between membrane 280 and impervious surface 282 may be available and in fluid communication with flow conduit 285 to allow fuel flow, as shown in FIG. 7(f).

Referring to FIG. 7(i), regulator valve 252 may also have seal 292, which can be a block of elastomer that seals the outlet of flow channel 284, so that seal 292 has to be moved away from flow channel 284 before fuel can be transported through regulator valve 252. Filler or retention material 286 can be placed either upstream or downstream of regulator valve 252, as shown in FIGS. 7(j) and 7(k), respectively. Alternatively, seal 292 can be disposed inside filler, absorbent material or retention material 286, as shown in FIG. 7(l). Additionally, another seal provided by O-ring 294 disposed around movable body 296, as shown in FIG. 7(m). The seal is provided between O-ring 294 and sidewall 298 of regulator valve 252, Filter, absorbent material or retention material 286 can also be disposed between valve 252 and movable body 296. Filler, absorbent material or retention material 286 discussed and illustrated herein can also be used with shut-off valves, such as those discussed in co-pending '006 patent application, which has been incorporated by reference in its entirety.

Although flow conduit 285 is illustrated with six legs, it can have any number of legs. Furthermore, flow conduit 285 may comprise non-liner legs or connected concentric circles or a spiraling inward line. The present invention is not limited to any particular configuration of the flow conduit.

Referring again to FIG. 4, alternatively, the byproducts are transferred back to fuel cartridge 12, 112, 212 for disposal. Relief valve 258 can be disposed on the fuel cartridge to vent the gas byproduct to atmosphere. Furthermore, byproduct chamber 256 can be omitted and the byproducts are transported directly from MEA 16 to mixing chamber 250. In an alternative embodiment, chamber 250 can be divided into two portions as illustrated by the broken line in chamber 250. Chamber 250a is adapted to receive fuel from the fuel cartridge and chamber 250b is adapted to receive the byproducts. Each chamber 250a and 250b is individually connected directly to MEA 16 or to another mixing chamber upstream of the MEA. Each chamber 250a, 250b can be individually connected to a pump, e.g., pump 262, to regulate the flow from each chamber to the MEA to obtain optimal fuel concentration.

With respect to the control circuit, controller 18, 118 is programmed to control the flow of fuel through the fuel cell. Controller 18, 118 can be positioned within fuel cell 10 or in electronic device 11, as shown. The controller can also be positioned on the fuel cartridge, or the functions of the controller can be performed by the central processing unit (CPU) or controller of the electronic device 11. As discussed above, controller 18, 118 can read information stored on information storage device 23, 123 on the fuel cartridge and write information this information storage device. Electrically readable fuel gauge 264 is positioned in or on the fuel cartridge to measure the amount of remaining fuel. Such gauge is disclosed in commonly owned patent application entitled "Fuel Gages for Fuel Cartridges," discussed above. Controller 18, 118 can also be connected to two-component valve 24, so that the controller can control the opening and closing of valve 24.

Within fuel cell 10, the controller is connected to information storage device 266 of pump 14, which stores relevant permanent and rewritable information concerning the pump, discussed above. The controller is also connected to flow meter 254, so that the controller can read the flow rate and the total time that pump 14 is in operation to determine the volume of fuel used. When the flow rate is constant, the volume is the product of the constant flow rate and the flow time. When the flow rate is varied, the volume is the integration of the variable flow rate over the flow time. This volume is subtracted from the original volume or the previous remaining volume information stored on information storage device 23, 123 to determine the remaining volume. Controller 18, 118 can also set the pumping rate of pump 14 or how wide regulating valve 252 should be opened to control the flow rate. The controller is also connected to optional pump 262, which pumps fuel or fuel mixture from mixing chamber 250 to the MEA to control the flow rate. Optionally, another regulating valve, similar to valve 252, is connected to pump 262 to control the flow rate.

Controller 18, 118 is also connected to information storage device 268 of MEA 16, which stores relevant permanent and rewritable information about the MEA, the bipolar plates and other components. The controller is also connect to concentration sensor 260 and reads the concentration of the fuel in the MEA. The controller can adjust the fuel incoming to the MEA to maintain an optimal fuel concentration for the fuel cell. Information storage devices 266 and 268 are substantially similar to information storage device 23, and 123 discussed above. All the information storage devices discussed herein are combined into one information storage device, or two or more information storage devices can be combined.

In accordance with one embodiment, when cartridge 12, 112, 212 is fluidically and electrically connected to fuel cell 10 or when electronic device 11 is turned on, controller 18, 118 first reads the information stored on information storage device 23, 123 to determine whether the proper cartridge is connected and/or the proper fuel is being stored. If the incorrect fuel or cartridge is present, then the controller ejects the cartridge, displays an error message or powers down to prevent damage. If the correct cartridge or fuel is present, then the controller reads the remaining fuel volume and other information, discussed above, and reads the information on information storage device 266 about the pump. The controller then instructs pump 14 to pump fuel from the cartridge and sets the size of the orifice of valve 252. The controller also reads the flow rate from flow meter 254 and keeps track of the time that fuel flows through regulator valve 252 to determine the volume of fuel used and the volume of remaining fuel. Alternatively, the controller can read the remaining fuel from fuel gage 264. The controller can also obtain the remaining fuel data from both sources and compare them. If the two volumes are different from each other by a predetermined amount, then the controller can recalibrate the sensors or display an error message.

The controller also monitors the concentration of fuel being reacted in the MEA. For direct methanol fuel cell, the concentration of methanol relative to water is an important factor. If the methanol concentration is too low, then the controller transports more methanol fuel from mixing chamber 250. If mixing chamber 250 has a separate methanol chamber, such as chamber 250a, then the controller instructs pump 262 to send more fuel to the MEA. If the methanol concentration is too high, then the controller instructs pump 262 to pump more water from chamber 250b to the MEA. This monitoring process continues as long as electronic device 11 is in operation.

The controller can also shut down pump 14 if mixing chamber 250 is substantially full. The controller can also read the operating information, such as temperature and pressure of the electronic device or the fuel cell and the electricity produced by the fuel cell, and write or record this information on information storage device 23, 123, 266 or 268. Preferably, the operating information is recorded on information storage device 23, 123 so that the manufacturer(s) of the electronic device, the fuel cell or the cartridge can access the information by simply disconnecting and removing the cartridge. Usage habits of the consumer, error information, system failures, etc., can also be recorded.

When the electronic device is turned off, the controller executes a shut-down procedure, which may include the steps of pumping fuel in the fluidic system back into the cartridge or pumping this fuel to mixing chamber 250. The controller would also write the volume of remaining fuel to information storage device 23, 123. Preferably, at start-up the controller instructs the pump to use fuel in mixing chamber 250 to fuel the MEA to start generating electricity, while the other systems are warming up. Alternatively, electronic device 11 initially draws current from a battery (not shown) while fuel cell 10 starts up. The controller can also execute a hot swap procedure stored on information storage device 23, 123, 266 or 268 or elsewhere on electronic device 11, when necessary.

In accordance with another aspect of the present invention, an ion filter and an ion sensor are provided to fuel cell 10 and/or cartridge 12, 112, 212. With respect to methanol fuel, metal ion particles may be present in the fuel. Metal ion particles when not removed from the fuel migrate into the proton exchange membrane (PEM) in MEA 16, and may clog the PEM. The REM efficiency may be affected and could reach a level where the MEA has to be periodically replaced or cleaned when the trapped ions reach a threshold level. Preferably, the ion filter comprises a medium made with an ion-conductive polymer, Suitable ion-conductive polymers are described in Davis, T. A., Genders, J. D. and Pletcher, D., "First Course in Ion Permeable Membranes," at pp. 35-57, and U.S. Pat. No. 6,630,518 B1, which are incorporated herein by reference in their entireties. These polymers include unsubstituted alkene copolymerized with a functionalized alkene containing ionizable groups or their precursors, and polymerized alkene and ion groups that are introduced into the membrane afterward. Other suitable ion-conductive polymers include GoreTex weatherproof material, which is a polytetrafluoroethylene (PUT), with a perfluorinated polymer filling the pores, and a polyvinyl fluoride (PVC) film irradiated in a 2.5% chlorosulfonic acid solution, The '518 patent discloses other suitable ion-conductive polymers, including a tow permeability membrane being irradiated and then sulfonated, Suitable membrane include polyethylene (PE), polypropylene (PP), polyhexafluoropropylene, polychlorotrifluoroethylene, polytetrafluoroethylene (PIPE), polyvinyl fluoride (PVF), polyvinylidene fluoride (PVDF), copolymers thereof and blends thereof. These membranes and the membranes with high permeability are usable with the present invention.

Other suitable filter media, which are also ion-conductive, include polystyrene sulfonic acid-polyvinylalcohol copolymer (PSSA-PVA) and polystyrene sulfonic acid-ethylene vinylalcohol copolymer (PSSA-EVOH), as discussed in U.S. Pat. Nos. 5,460,896 and 5,409,785. These references are incorporated herein by reference in their entireties.

Ions are then attracted to and are trapped in the ion filter. Thus, the ions are removed from the fuel and the life of the PEM is extended. Additionally, the controller can read the ion level in the fuel and write this information to information storage device 23, 123, no that fuel supplies 12, 112, 212 that have unacceptable level of ions will not be utilized. The controller can check the ion level in the fuel whenever the electronic device is turned on or when a different cartridge is installed. Referring again to FIG. 4, in one embodiment, ion filter 270 is located in nozzle 22 of the cartridge to trap ions as they leave the cartridge. The ion filter can also be positioned inside fuel cell 10. It is, however, more convenient to locate the filter in the cartridge so that the filter can be replaced more easily.

The ion filter medium can also be made with metal scavengers. Metal scavengers are relatively large molecules that have a propensity to attract and attach to metals. Metal scavengers include flocculants used in waste water treatment applications. The flocculants are typically added to waste water to remove metals from the water. Metal scavengers when exposed fuel removes the metal ion particles from the fuel. The reacted scavengers are relatively large and can be removed by a sieve, or contained, Suitable flocculants include Clarifloc A-3020 available from Poly Pure, Inc., Parsippany, N.J.; Flocculite 402 available from Dubois, Cincinnati, Ohio, and J. Flock 711 available from Jamestown Chemical, Westhaven, Conn. The flocculating agent is prepared as a diluted aqueous solution in concentrations of from about 0.001% to about 0.01% by volume. The flocculants can be mixed with the water in mixing chamber 250 and/or byproduct chamber 256 to trap metal ions. Preferably, filler or retention materials are added to the inlet and outlet of these chambers to prevent the flocculants from leaving. Alternately, the flocculants can be impregnated into a porous support, such as porous polypropylene or polyethylene or an open mesh structure. The impregnated porous medium can be used as the filter medium within ion filter 270.

Other metal scavengers include 3-(diethylenetriamino) propyl-functionalized gel, 2-(4-(ethylenediamino)benzene) ethyl-functionalized silica gel, 3-(mercapto)propyl-functionalized silica gel, 3-(1-thioureido)propyl-functionalized silica gel and triamine tetraacetate-functionalized silica gel. These silica gels are available from The Sigma-Aldrich Co.

Another suitable metal scavenger is the metal chelating compound used in the biological field to remove metal ions from biological fluids. A preferred compound is ethylenediaminetetraacetate (EDTA), EDTA is known to bind tightly to metal ions. EDTA can be added to cartridge 12, 112, 212, to mixing chamber 250 and/or byproduct chamber 256. EDTA can also impregnate a porous support similar to flocculants, and be used as the filter medium.

Ion sensor 272 is provided to ascertain the effectiveness of the filter and to determine when the filter should be replaced. Ion sensor 272 is preferably located within fuel cell 10 as shown, or be disposed on the fuel cartridge. Ion sensor 272 is electrically connected with controller 18, 118 and is readable by the controller. Ion sensor 272 applies an electrical field to the fuel, e.g., across the tube carrying fuel or within the tithe. This electrical field applies either a constant voltage across the fuel or a constant current though the fuel. The electrical conductivity of the fuel depends on the concentration of the ions in the fuel. The electrical filed alternatively can be applied across or through a porous element that fuel flows through. The ion population is directly proportional to either the current flowing through the filet if a constant voltage is applied across the fuel or the voltage across the fuel if a constant current is flowing through the filet. A real-time ion measurement is compared to abuse-line measurement of low ion fuel to determine whether the ion level is acceptable. Alternatively, a calibration curve or table can be drawn from data points representing low ion level, unacceptable ion level and one or more points therebetween. The real-time measurement can be compared to this calibration curve to ascertain the ion level during use. Controller 18, 118, as shown, periodically reads this voltage and when the voltage reaches a predetermined level, the controller displays a message or other signal such as a visual or audible signal, to the user to change the ion filter, possibly at the next refill of the fuel supply.

Figure 5:
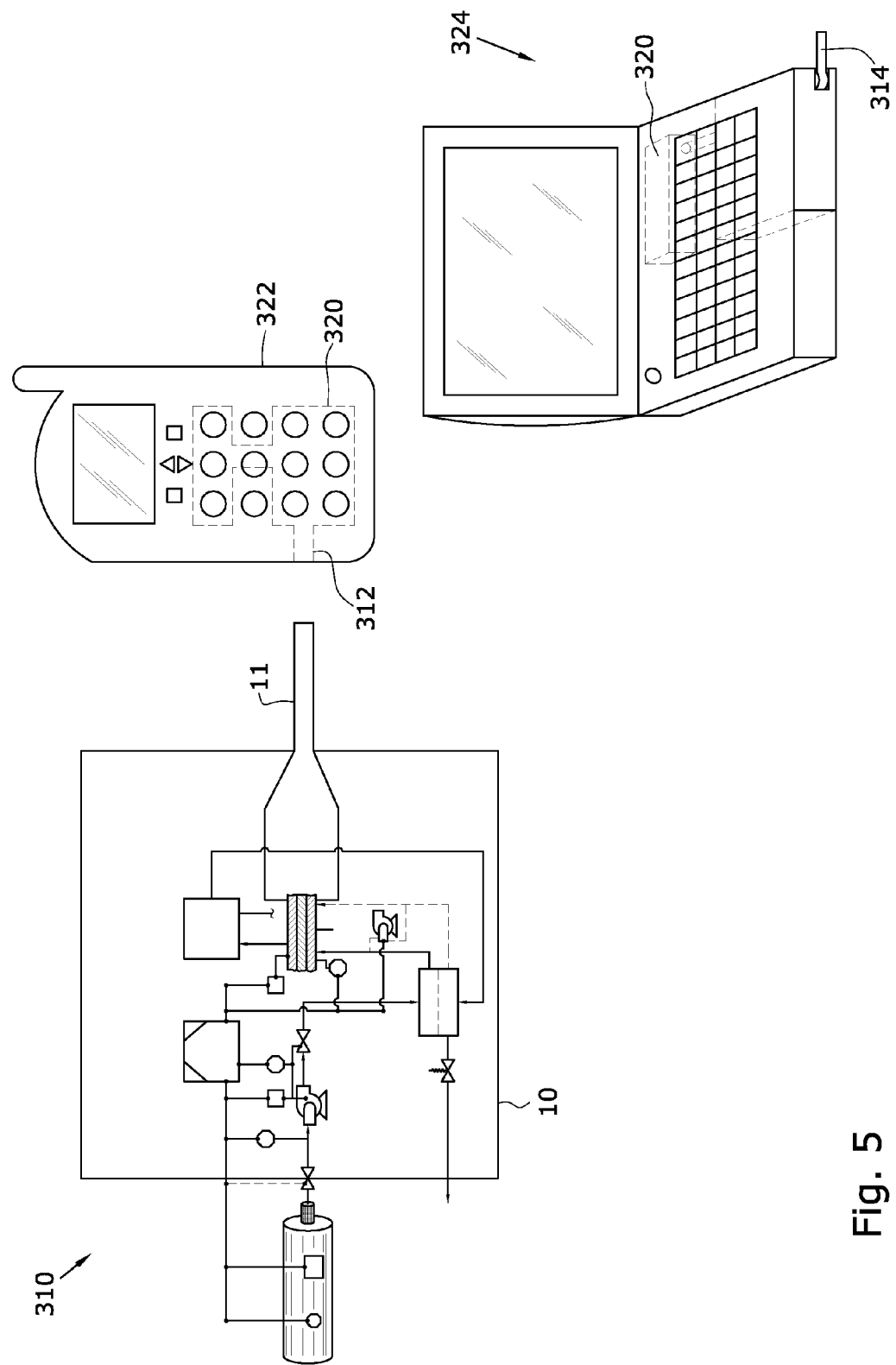
FIG. 5 is a schematic view of another fuel cell system of the present invention.

Referring to FIG. 5, in accordance to another aspect of the present invention, charger 310 is provided and is adapted to charge batteries. Charger 310 can also recharge battery operated electronic devices, such as those described above. As shown in FIG. 5, charger 310 has substantially the same components as fuel cell 10 shown in FIG. 4, and that cartridge 12, 112, 212 and controller 18, 118 are internal to charger 310. The electrical current produced by MEA 16 inside charger 310 is present at contact 11. In the other embodiments of the present invention, reference number 11 designates a load or an electronic device powered by the fuel cell. Similarly, in FIG. 5 reference number 11 designates a contact that connects to a battery operated device that the fuel cell recharges.

Normally, contact 11 is an open electrical loop so that no electricity is flowing through contact 11. After contact 11 connects to contact 312, 314 on the battery operated devices 322, 324, the electricity generated by MEA 16 flows through the recharging electrical device to recharge battery 320. Contact 312, 314 can be a male or female connection. Battery operated devices include, but are not limited to, mobile phone 322 and laptop computer 324, as well as the electronic devices discussed above, Batteries 320 can be recharged white remaining inside the electronic device or be recharged outside of the electronic device. As illustrated in FIG. 5, charger 310 assumes a generic shape, and can be a cradle charger (e.g., for mobile phones and power tools), a docking station (I e.g., for laptop computers) or a charger for conventional batteries (e.g., "AA", "AAA", "D" size alkaline rechargeable batteries), among others.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

We claim:

1. An information storage device for a fuel cell system, wherein the information storage device comprises a hot swap procedure, wherein the hot swap procedure comprises an instruction for a controller accessing the information storage device to switch to an alternate power source for an electronic device that the fuel cell system powers.

2. The information storage device of claim 1, wherein the information storage device is located in the fuel cell system.

3. The information storage device of claim 1, wherein the information storage device is located in an electronic device that the fuel cell system powers.

4. The information storage device of claim 1, wherein the information storage device is located on a fuel supply supplying fuel to the fuel cell system.

5. The information storage device of claim 1, wherein the alternate power source comprises a battery.

6. The information storage device of claim 1, wherein the alternate power source comprises a reserve fuel chamber containing fuel for the fuel cell system.

7. The information storage device of claim 1, wherein the controller writes information to the information storage device while using the alternate power source.

8. The information storage device of claim 1, wherein the hot swap procedure comprises semaphore "lock" and semaphore."unlock" verbs.

9. The information storage device of claim 1, wherein the controller accessing the information storage device executes the hot swap procedure when a first flag is set.

10. The information storage device of claim 9, wherein the first flag is a semaphore."lock".

11. The information storage device of claim 9, wherein the controller backs up data during the hot swap procedure.

12. The information storage device of claim 9, wherein a second flag is set when the controller completes the hot swap procedure.

13. The information storage device of claim 9, wherein the second flag is a semaphore."unlock".

14. The information storage device of claim 9, wherein a first flag is set when a fuel cartridge is removed from the fuel cell system when the fuel cell system is active.

15. The information storage device of claim 9, wherein a first flag is set when an ejection button is actuated to remove a fuel cartridge from the fuel cell system when the fuel cell system is active.

16. The information storage device of claim 1, wherein the controller accesses the information storage device when a trigger event occurs.

17. The information storage device of claim 16, wherein the trigger event comprises a removal of a fuel supply containing fuel for the fuel cell system when the electronic device is operational.

18. An information storage device for a fuel cell system, wherein the information storage device comprises a hot swap procedure, wherein the hot swap procedure comprises instructions for a controller accessing the information storage device to switch to an alternate power source for an electronic device that the fuel cell system powers and to instruct a pump for pumping fuel to the fuel cell system to shut down in accordance to a predetermined sequence when a trigger event occurs.

19. An information storage device for a fuel cell system, wherein the information storage device comprises a hot swap procedure, wherein the hot swap procedure comprises an instruction for a controller accessing the information storage device to instruct a pump to execute a shutdown cycle.

20. The information storage device of claim 19, wherein the shutdown cycle includes continuing pumping for a time period.

21. The information storage device of claim 19, wherein the instruction comprises running the pump using an alternate power source to pump fuel away from an interface between the fuel cell system and a fuel supply containing fuel for the fuel cell system.

22. An information storage device for a fuel cell system, wherein the information storage device comprises a hot swap procedure, wherein the information storage device further comprises an instruction to pump fuel away from an outlet of a fuel cartridge, when a device powered by the fuel cell system is turned off.

* * * * *